United States Patent [19]

Nomura

[11] Patent Number: 5,079,577
[45] Date of Patent: Jan. 7, 1992

[54] SUPPORTING APPARATUS OF FLEXIBLE PRINTED CIRCUIT BOARD OF LENS BARREL

[75] Inventor: Hiroshi Nomura, Tokyo, Japan

[73] Assignee: Asahi Kogaku Kogyo Kabushiki Kaisha, Tokyo, Japan

[21] Appl. No.: 628,011

[22] Filed: Dec. 17, 1990

[30] Foreign Application Priority Data

Jun. 1, 1990 [JP] Japan ................. 2-58106[U]

[51] Int. Cl.⁵ ............................................. G03B 9/52
[52] U.S. Cl. ..................... 354/233; 354/286; 354/485
[58] Field of Search ................. 354/233, 234.1, 286, 354/485

[56] References Cited

U.S. PATENT DOCUMENTS

| | | | |
|---|---|---|---|
| 4,596,454 | 6/1986 | Kawai et al. | 354/286 |
| 4,944,030 | 7/1990 | Haraguchi et al. | 354/403 |
| 4,951,083 | 8/1990 | Okura et al. | 354/485 |

FOREIGN PATENT DOCUMENTS 2219412 12/1989 United Kingdom .
2231974 11/1990 United Kingdom .

Primary Examiner—Michael L. Gellner
Attorney, Agent, or Firm—Sandler, Greenblum & Bernstein

[57] ABSTRACT

A supporting apparatus for a flexible printed circuit board includes a shutter holding frame which is integrally provided on the rear end of a shutter unit, and a frictional keeping member which frictionally holds the flexible printed circuit board which extends rearwardly from the front end of the shutter unit, along the circumference thereof, so as to extend along the rear end of the shutter holding frame.

10 Claims, 3 Drawing Sheets

SUPPORTING APPARATUS OF FLEXIBLE PRINTED CIRCUIT BOARD OF LENS BARREL

BACKGROUND OF THE INVENTION

1. Field of the Invention

The present invention relates to a lens barrel, and more precisely, it relates to a supporting apparatus for a flexible printed circuit board connected to a cylindrical shutter unit in a lens barrel.

This application is related to commonly assigned application U.S. Ser. No. 07/602,176, the disclosure of which is expressly incorporated by reference herein in its entirety.

2. Description of Related Art

In a lens shutter type of camera, a cylindrical shutter unit is provided in a lens barrel. As is well known, the shutter unit drives a focusing lens group in accordance with a distance signal of a subject to be photographed, detected by an object distance measuring device, and opens and closes shutter blades in accordance with a luminance signal of the subject as detected by a light measuring device. The shutter unit is usually provided on its front end face with driving signal terminals which are connected to the front end of a flexible printed circuit board, which will be referred to as an FPC board hereinafter. The FPC board extends along the circumference of the shutter unit to the rear side of the camera body, to be connected to a control circuit provided in the camera body, through a guide means.

The FPC board is adhered to the shutter unit by an adhesive tape or an adhesive or the like so as not to move or extend outwardly from the peripheral surface of the shutter unit. However, the shutter unit (i.e., the outer diameter thereof) is made as small as possible to realize a compact and small camera, and, accordingly, shutter components, such as a driving gear or a spring, are partially exposed from the shutter unit. Accordingly, upon adhering the FPC board to the shutter unit, the adhesive tape or the adhesive must be carefully used so as not to interfere with the exposed shutter components, which is a very troublesome operation.

SUMMARY OF THE INVENTION

The primary object of the present invention is to provide a supporting apparatus for an FPC board which can be supported on a shutter unit so as not to move or extend outwardly from the peripheral surface of the shutter unit, without using an adhesive tape or an adhesive.

The present invention includes a keeping member for the FPC board on the rear end of a shutter holding frame, to which a shutter unit is secured to hold the FPC board so as to extend along the rear end face of the shutter holding frame.

To achieve the object mentioned above, according to the present invention, there is provided a lens barrel comprising a cylindrical shutter unit, a shutter holding frame which holds a rear end portion of the shutter unit, a flexible printed circuit board which extends rearwardly from the front end of the shutter unit along the circumference thereof, and a keeping member which is provided on the rear end of the shutter holding frame to hold the flexible printed circuit board past the circumference of the shutter unit and so as to extend along the rear end of the shutter holding frame.

With this arrangement, since the portion of the FPC board located beyond the circumference of the shutter unit is bent along the rear end face of the shutter holding frame and is firmly held by the keeping member on the rear end face of the shutter holding frame, neither adhesive tape nor adhesive are necessary to hold the FPC board; and therefore, no loosening of the FPC board occurs.

Preferably, the keeping member defines a passage for the flexible printed circuit board, between the keeping member and the recess. The passage for the flexible printed circuit board has a width slightly larger than the thickness of the flexible printed circuit board.

Preferably, the keeping member is attached to the shutter holding frame, so that the keeping member permits the flexible printed circuit board to move within the passage whenever the flexible printed circuit board is tensed, and prevents the flexible printed circuit board from moving when no tensile force is applied thereto.

According to another aspect of the present invention, in a lens barrel having a shutter unit which is movable in an optical axis direction and a flexible printed circuit board which sends an operational signal to the shutter unit, a supporting apparatus for the flexible printed circuit board comprises a shutter holding frame which is integrally provided on the rear end of the shutter unit. The flexible printed circuit board extends rearwardly from the front end of the shutter unit along the circumference thereof. A frictional keeping member is also provided which frictionally holds the flexible printed circuit board past, i.e., beyond, circumference of the shutter unit to extend along the rear end of the shutter holding frame due to a frictional force.

The present disclosure relates to subject matter contained in Japanese Utility Model Application No. 2-58106 (filed on June 1, 1990).

BRIEF DESCRIPTION OF THE DRAWINGS

The invention will be described below in detail with reference to the accompanying drawings, in which.

DESCRIPTION OF THE PREFERRED EMBODIMENTS

The illustrated embodiment is applied to a zoom lens barrel, as disclosed in U.S. Ser. No. 07/602,176, filed in the name of the assignee of the present application.

Figure 3:
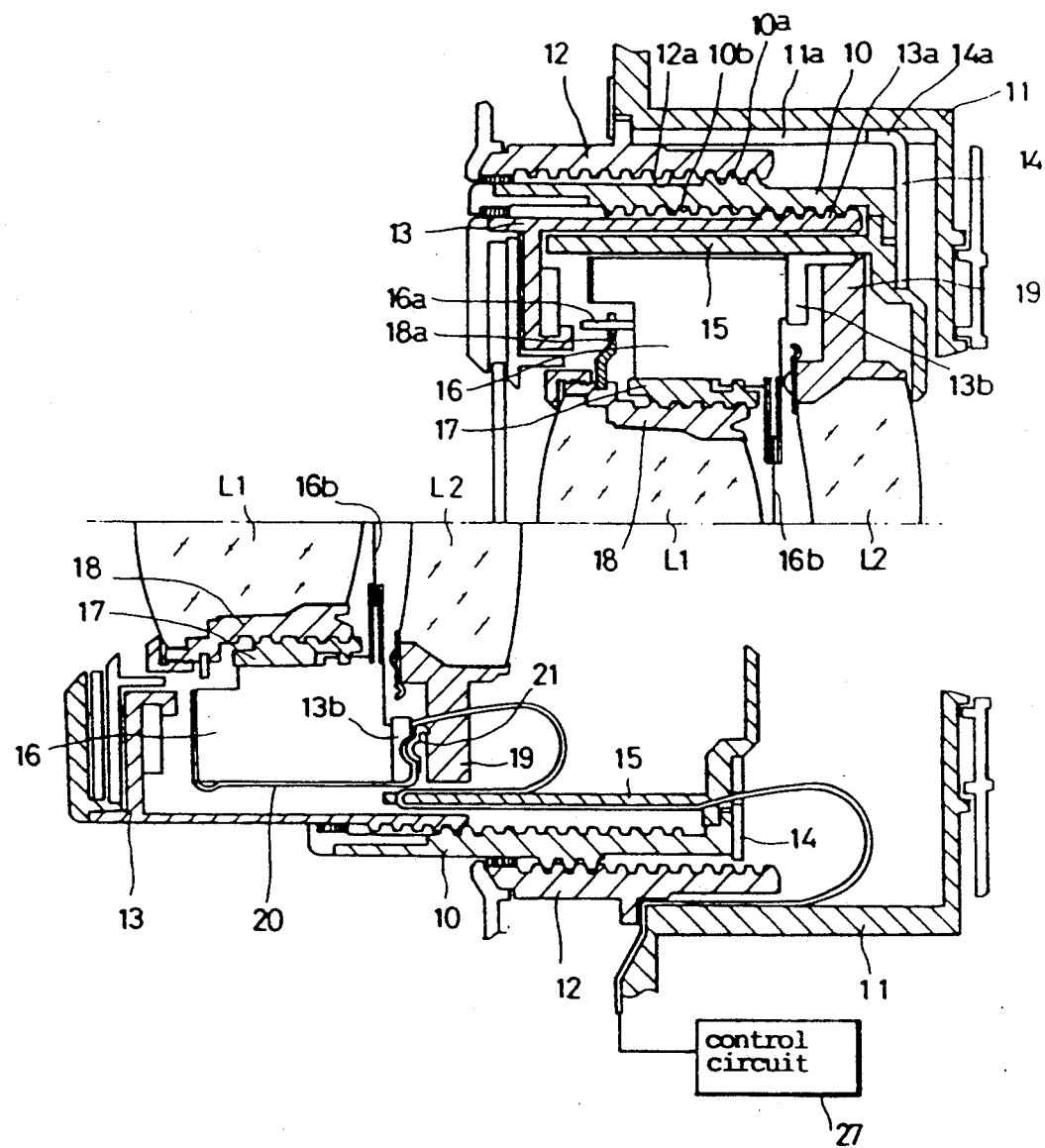
FIG. 3 is a longitudinal sectional view of a whole lens barrel, of which an upper half shows a retracted position in which a lens group is retracted in a camera body and a lower half shows a projection position (telephoto position) in which the lens group projects outwardly from the camera body.

FIG. 3 shows a whole construction of such a zoom lens barrel. An immovable lens barrel 11, integral with a camera body, has a helicoid ring 12 secured thereto, which has a female helicoid 12a which is engaged by a male helicoid 10a formed on the outer periphery of a cam ring 10. The cam ring 10 is provided, on its inner peripheral surface, with a female helicoid 10b and a cam groove or cam grooves (not shown). The female helicoid 10b is engaged by a male helicoid 13a which is formed on a front lens barrel 13. The cam ring 10 is provided on its rear end with a linear movement guide plate 14 secured thereto which has a radial projection 14a which is fitted in a linear movement guide groove 11a formed on the immovable lens barrel 11. A linear movement guide ring 15 is secured to the linear movement guide plate 14. The cam ring 10 is free to rotate relative to the linear movement guide ring 15.

A shutter holding frame 13b to which a rear end of an annular shutter unit 16 is secured to the front lens barrel 13. The shutter unit 16 is provided on its inner peripheral surface with a helicoid ring 17 integral therewith which is engaged by a front lens frame 18 which holds a front lens group L1. The shutter unit 16 has a driving pin 16a which engages with a driven pin 18a provided on the front lens frame 18 integral therewith. The driving pin 16a is rotated through an angular displacement determined in accordance with a subject distance signal outputted from an object distance measuring device (not shown), as is well known. The rotation of the driving pin 16a is transmitted to the front lens frame 18 through the driven pin 18a, so that the front lens frame 18 (the front lens group L1) is moved while rotating in the optical axis direction through the shutter unit 16 to effect focusing. The shutter unit 16 opens and closes the shutter blades 16b in accordance with the luminance signal of the subject to be photographed.

A rear lens frame 19 which holds a rear lens group L2 has a cam pin (not shown), which projects in the radial direction, to be fitted in the cam groove (not shown) formed on the inner surface of the cam ring 10. The rear lens frame 19 and the shutter holding frame 13b are guided by the linear guide surfaces of the linear guide ring 15 so as to linearly move in the optical axis direction.

Consequently, when the cam ring 10 rotates, the cam ring 10 is moved in the optical axis direction in accordance with the engagement of the male helicoid 10a and the female helicoid 12a. At the same time, the front lens frame 13 and accordingly the front lens group L1 are moved in the optical axis direction in accordance with the engagement of the female helicoid 10b and the male helicoid 13a, through the linear movement guide mechanism of the shutter holding frame 13b and the linear movement guide ring 15. Also, the rotation of the cam ring 10 causes the rear lens frame 19 and, accordingly, the rear lens group L2, to move in the optical axis direction, in accordance with the engagement of the cam pin (not shown) of the rear lens frame 19 and the cam groove (not shown) formed on the inner surface of the cam ring 10, through the linear movement guide mechanism of the rear lens frame 19 and the linear movement guide ring 15 to effect the zooming operation.

The annular shutter unit 16 is provided on its front end face with driving signal terminals (not shown) to which the front end of the FPC board 20 is secured. The FPC board 20 extends rearwardly along the circumference of the shutter unit 16 and is supported on the rear end face of the shutter holding frame 13b by a keeping member 21 according to one of the most significant features of the present invention.

Figure 1:
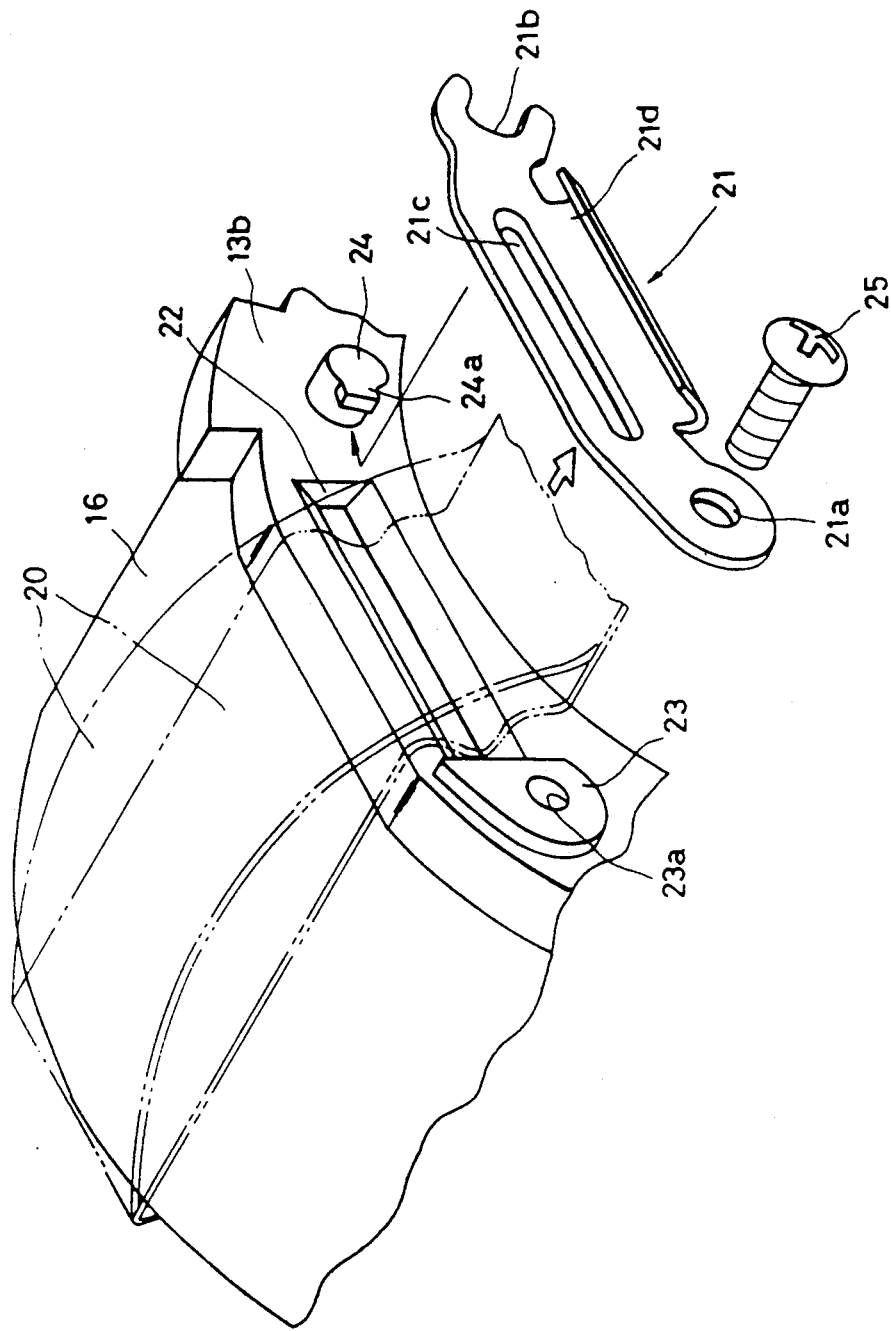
FIG. 1 is an exploded perspective view of a main part of a lens barrel according to an embodiment of the present invention.
Figure 2:
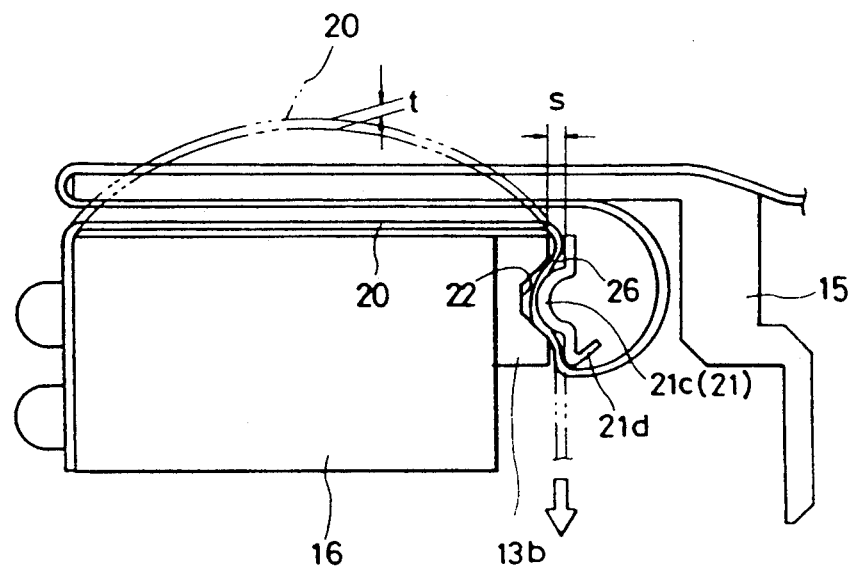
FIG. 2 a side elevation view of the main part of a lens barrel shown in FIG. 1, when assembled.

Namely, the shutter holding frame 13b has a laterally elongated recess 22 having a width corresponding to the width of the FPC board 20, as shown in FIGS. 1 and 2. The shutter holding frame 13b is provided with a mount 23 at the vicinity of one end of the lateral recess 22 and a supporting projection 24 in the vicinity of the other end of the lateral recess 22. The mount 23 has a threaded hole 23a in which a set screw 25 can be screwed. The supporting projection 24 has at its front end a retaining piece 24a projecting therefrom toward the lateral recess 22.

The plate-like keeping member (frictional holder) 21 is held between the mount 23 and the supporting projection 24. The keeping member 21 has a through hole 21a corresponding to the threaded hole 23a of the mount 23 and a bifurcated portion 21b corresponding to the supporting projection 24 (retaining piece 24a). Also, the keeping member 21 is provided on its intermediate portion with a laterally extending pusher 21c which projects into the lateral recess 22 of the shutter holding frame 13b and a bent portion 21d which is adapted to smoothly guide and bend the FPC board 20 outwardly along therewith below the recess 22, respectively.

The keeping member 21 is held between and by the mount 23 and the supporting projection 24, so that the FPC board 20 which extends rearwardly from the front end of the shutter unit 16 along the circumference thereof is held in the recess 22 by the keeping member 21 (the pusher 21c thereof). Namely, the bifurcated portion 21b of the keeping member 21 is pressed against the supporting projection 24 inside the retaining piece 24a, and the set screw 25 is inserted in the through hole 21a of the keeping member 21 and is screwed in the threaded hole 23a of the mount 23. In this state, a generally V-shaped (in cross section) passage 26 for the FPC board 20 is defined between the lateral pusher 21c and the lateral recess 22, as shown in FIG. 2. The V-shaped passage 26 has a width s which is slightly larger than the thickness t of the FPC board 20. The width (distance) s is determined so that on one hand, the FPC board 20 can move in the passage 26 when the FPC board 20 is tensed, and on the other hand, no accidental displacement of the FPC board 20 takes place due to the frictional force between the passage 26 and the FPC board 20 when the tensile force is released from the FPC board 20.

In the supporting apparatus as constructed above, according to the present invention, the keeping member 21 is secured to the rear end of the shutter holding frame 13b while the FPC board 20 is flexibly bent as shown by a phantom line in FIGS. 1 and 2. Thereafter, when the FPC board 20 is tensed at the rear portion thereof, the FPC board 20 extends along and close to the circumference of the shutter unit 16. Even if the tensile force is released, the FPC board 20 is maintained in the tensed state due to the frictional force between the passage 26 (the lateral pusher 21c of the keeping member 21 and the lateral recess 22 of the shutter holding frame 13b) and the FPC board 20. Thus, the FPC board 20 can be firmly held on the circumference of the shutter unit 16 closely thereto without using an adhesive tape or an adhesive, unlike the prior art in which adhesive tape or an adhesive must be inevitably used, as mentioned before.

The portion of the FPC board 20 extending past the keeping member 21 extends radially outwardly along the bent portion 21d of the keeping member 21. The FPC board 20 further extends forwardly along the inner surface of the linear movement guide ring 15 and is bent rearwardly at the front end of the linear movement guide ring 15 to extend again rearwardly along the outer surface of the linear movement guide ring 15, as shown in FIG. 3. The FPC board 20 is further bent forwardly again behind the linear movement guide ring 15, passes through a gap between the helicoid ring 12 and the immovable barrel 11, and is connected to a control circuit 27 of the camera body. The control circuit 27 outputs an operational signal to the shutter unit 16 through the FPC board 20 in accordance with the subject distance signal and the subject luminance signal.

The guide and the passage of the FPC board 20 past the keeping member 21 are not the only subject of the present invention, and, accordingly, can be modified.

I claim:

1. A lens barrel comprising:
    a cylindrical shutter unit;
    a shutter holding frame which holds a rear end portion of said shutter unit;
    a flexible printed circuit board which extends rearwardly from the front end of said shutter unit along the circumference of said shutter unit; and
    a keeping member which is provided on the rear end of said shutter holding frame to hold said flexible printed circuit board past the circumference of said shutter unit so as to extend along the rear end of said shutter holding frame.

2. A lens barrel according to claim 1, wherein said shutter holding frame is provided on its rear end with a recess.

3. A lens barrel according to claim 2, wherein said keeping member defines a passageway for said flexible printed circuit board, between said keeping member and said recess.

4. A lens barrel according to claim 3, wherein said passageway for said flexible printed circuit board has a width slightly larger than the thickness of said flexible printed circuit board.

5. A lens barrel according to claim 3, wherein said passageway for said flexible printed circuit board is bent into a generally V-shape cross-section.

6. A lens barrel according to claim 4, wherein said keeping member has a bent portion which guides and bends the portion of said flexible printed circuit board which extends along the rear end of said shutter holding frame radially outwardly.

7. A lens barrel according to claim 1, wherein said keeping member is attached to said shutter holding frame, so that said keeping member permits said flexible printed circuit board to move in the passage when said flexible printed circuit board is tensed and prevents said flexible printed circuit board from moving when no tensile force is applied thereto.

8. A lens barrel according to claim 1, further comprising a lens frame which holds said shutter unit and which moves in an optical axis direction of the lens barrel during zooming.

9. In a lens barrel having a shutter unit which is movable in an optical axis direction and a flexible printed circuit board which sends an operational signal to said shutter unit, a supporting apparatus for said flexible printed circuit board which comprises:
    a shutter holding frame which is integrally provided on the rear end of said shutter unit, said flexible printed circuit board extending rearwardly from the front end of said shutter unit along the circumference of said shutter unit; and
    frictional keeping member which frictionally holds said flexible printed circuit board extending past the circumference of said shutter unit so as to extend along the rear end of said shutter holding frame due to frictional force.

10. A supporting apparatus according to claim 9, wherein the frictional force is such that said frictional keeping member permits said flexible printed circuit board to move when said flexible printed circuit board is tensed and prevents said flexible printed circuit board from moving when no tensile force is applied thereto.

* * * * *